US008108201B2

(12) United States Patent
Ragnunath et al.

(10) Patent No.: US 8,108,201 B2
(45) Date of Patent: Jan. 31, 2012

(54) METHOD FOR EMULATING A NATIVE DEVICE ON A HOST COMPUTER SYSTEM

(75) Inventors: Mandayam Thondanur Ragnunath, Fishkill, NY (US); Chandrasekhar Narayanaswami, Wilton, CT (US)

(73) Assignee: International Business Machines Corporation, Armonk, NY (US)

( * ) Notice: Subject to any disclaimer, the term of this patent is extended or adjusted under 35 U.S.C. 154(b) by 841 days.

(21) Appl. No.: 11/282,089

(22) Filed: Nov. 17, 2005

(65) Prior Publication Data

US 2007/0112552 A1    May 17, 2007

(51) Int. Cl.
*G06F 9/455* (2006.01)
(52) U.S. Cl. ............... 703/24; 703/23; 703/25; 703/26; 703/27; 703/28
(58) Field of Classification Search ............ 703/23–27, 703/28
See application file for complete search history.

(56) References Cited

U.S. PATENT DOCUMENTS

| | | | | |
|---|---|---|---|---|
| 5,920,826 | A * | 7/1999 | Metso et al. .................. | 455/557 |
| 6,356,543 | B2 * | 3/2002 | Hall et al. ..................... | 370/352 |
| 6,694,134 | B1 * | 2/2004 | Lu et al. ........................ | 455/419 |
| 6,832,084 | B1 * | 12/2004 | Deo et al. ..................... | 455/419 |
| 6,877,074 | B2 * | 4/2005 | Naitoh et al. ................ | 711/154 |
| 6,907,519 | B2 * | 6/2005 | Desoli ........................... | 712/227 |
| 6,988,193 | B2 * | 1/2006 | French et al. ................... | 713/2 |
| 7,512,402 | B2 * | 3/2009 | Narayanaswami et al. ... | 455/420 |
| 7,590,103 | B2 * | 9/2009 | Fujiwara et al. ............. | 370/352 |
| 7,813,910 | B1 * | 10/2010 | Poulin ............................ | 703/22 |
| 2002/0111176 | A1 * | 8/2002 | Roeder .......................... | 455/466 |
| 2003/0018825 | A1 * | 1/2003 | Johnson et al. ............... | 709/310 |
| 2003/0046447 | A1 * | 3/2003 | Kouperchliak et al. ....... | 709/321 |
| 2003/0087601 | A1 * | 5/2003 | Agam et al. .................. | 455/39 |
| 2003/0115038 | A1 * | 6/2003 | Want et al. ..................... | 703/24 |
| 2003/0191623 | A1 * | 10/2003 | Salmonsen .................... | 703/24 |
| 2003/0211865 | A1 * | 11/2003 | Azami et al. .................. | 455/557 |
| 2004/0015893 | A1 * | 1/2004 | Banavar et al. .............. | 717/138 |
| 2004/0049668 | A1 * | 3/2004 | Miyamoto et al. ............. | 713/1 |
| 2004/0049670 | A1 * | 3/2004 | Miyamoto et al. ............. | 713/2 |
| 2004/0092266 | A1 * | 5/2004 | Olrik ............................. | 455/445 |
| 2004/0199909 | A1 * | 10/2004 | Goodman ..................... | 717/168 |
| 2004/0230710 | A1 * | 11/2004 | Goodman ........................ | 710/8 |
| 2004/0236997 | A1 * | 11/2004 | Poo ................................ | 714/36 |
| 2005/0005076 | A1 * | 1/2005 | Lasser ........................... | 711/154 |
| 2005/0066086 | A1 * | 3/2005 | Ramanathan .................. | 710/63 |
| 2005/0109841 | A1 * | 5/2005 | Ryan et al. .................... | 235/380 |

(Continued)

OTHER PUBLICATIONS

Motorola, "Mobile Phone Tools Quick Start," V3,11, Dec. 31, 2004.

*Primary Examiner* — Kamini S Shah
*Assistant Examiner* — Kibrom Gebresilassie
(74) *Attorney, Agent, or Firm* — Michael J. Buchenhorner; Vazken Alexanian

(57) ABSTRACT

A native device includes a memory storing a personal computing environment; an interface configured for coupling with a host information processing system; a native function system for performing a native function; and a native function emulator for emulating the native function in the host information processing system. According to another embodiment, a host information processing system includes: an interface for coupling with a native device comprising its user's personal computing environment; a processor configured for operating with the native device when the native device is coupled; and logic for emulating functions of the native device when the native device is coupled.

16 Claims, 3 Drawing Sheets

U.S. PATENT DOCUMENTS

| | | | |
|---|---|---|---|
| 2005/0166015 A1* | 7/2005 | Bruner et al. | 711/112 |
| 2005/0204013 A1* | 9/2005 | Raghunath et al. | 709/217 |
| 2005/0209842 A1* | 9/2005 | Klein | 703/25 |
| 2006/0008067 A1* | 1/2006 | Shaffer et al. | 379/201.06 |
| 2006/0031668 A1* | 2/2006 | Miyamoto et al. | 713/2 |
| 2006/0069543 A1* | 3/2006 | Sajwani et al. | 703/24 |
| 2006/0105712 A1* | 5/2006 | Glass et al. | 455/41.2 |
| 2006/0111190 A1* | 5/2006 | Yoshino et al. | 463/45 |
| 2006/0142991 A1* | 6/2006 | Sajwani et al. | 703/25 |
| 2006/0143314 A1* | 6/2006 | Sinha et al. | 710/5 |
| 2006/0212360 A1* | 9/2006 | Stefanik et al. | 705/26 |
| 2006/0259292 A1* | 11/2006 | Solomon et al. | 703/27 |
| 2007/0006178 A1* | 1/2007 | Tan | 717/136 |
| 2007/0016895 A1* | 1/2007 | Tan | 717/136 |
| 2007/0074192 A1* | 3/2007 | Geisinger | 717/148 |
| 2007/0075133 A1* | 4/2007 | Yeager | 235/380 |
| 2007/0199432 A1* | 8/2007 | Abe et al. | 84/645 |
| 2008/0046990 A1* | 2/2008 | Narayanaswami et al. | 726/9 |
| 2009/0156267 A1* | 6/2009 | Narayanaswami et al. | 455/567 |
| 2009/0182546 A1* | 7/2009 | Gentric | 703/27 |

* cited by examiner

METHOD FOR EMULATING A NATIVE DEVICE ON A HOST COMPUTER SYSTEM

CROSS-REFERENCE TO RELATED APPLICATIONS

The invention disclosed herein relates to an improvement on the invention disclosed in U.S. patent application Ser. No. 10/795,153, now abandoned, which is hereby incorporated by reference.

FIELD OF THE INVENTION

The invention disclosed broadly relates to the field of information processing systems, and more particularly relates to the field of portable electronic devices.

BACKGROUND OF THE INVENTION

Modern portable electronic devices, such as that described in U.S. patent application Ser. No. 10/795,153, enable users to carry a physically small storage device with the user's computing environment and to attach it to a physically larger information processing device (e.g. a personal computer or PC) and personalize the larger device. As used herein, a "portable storage device" or "portable device" is any electronic device that includes sufficient storage capacity to operate according to the various embodiments of the invention, and is not necessarily a device whose principal function is storage. For example a mobile telephone can include enough information storage capacity to store the personal computing environment of a user. We call such portable devices "native devices" and the computer to which they are connected, a host system. If the host system is booted from the native device the native device essentially needs to stay connected to the host system and there is a need for emulation support for performing all or part of the function provided by the native device. However, one may also connect the native device to the host system over a USB wire to simply charge its battery using the USB power supply. Even in this case emulation support can be desirable.

A difficulty arises when the native device is connected to the host system in this fashion and the user wants to use the native device for its native function while using the host system because the native function of the native device may be inaccessible. For instance when the native device is a mobile phone, it may not be convenient for the user to answer an incoming phone call easily since the phone is connected to the host device by a wire. Therefore, there is a need for a method and system that overcomes the above difficulty. Other common native devices where this problem exists include MP3 players, game units, PDAs (Personal Digital Assistants), and the like.

SUMMARY OF THE INVENTION

Briefly, according to one embodiment of the invention, the above difficulty is overcome by using a software application (hereafter denoted as "software emulator" or simply, "emulator") that emulates the operation (native function) of a native device. The software emulator has access to the native device's storage, I/O devices, and can communicate with programs running on the native device. The software emulator may include the complete functionality of the native device or some subset of the functionality of the native device. The emulator may reside on the native device or on the host system or both. When the emulator resides in the native device, the host can boot from the native device and use the native device—resident emulator to emulate the native function. When the emulator resides in the host, the native device can be connected to the host system while the host system is running and the host system uses its own emulator to emulate the native function. In either case, the host system uses an emulator interface to communicate with the native device. Several functional partition choices are possible. In one embodiment a software emulator uses one or more of the I/O capabilities of the host system such as keyboard, mouse, and display and the compute capabilities of the host system to perform the complete function of the native device. Other embodiments use a combination of a software emulator and a piece of interface software on the native device that provides access to some of the subsystems on the native device such as its input devices, communication subsystem, storage subsystem, and the like. For instance, it is much easier to scroll through music using an iPod™ media player's scroll wheel rather than a mouse or keyboard cursor keys of the host. In this example, the emulator running on the host uses the input controls from the iPod native device, and is accessing the music files from the iPod, but playing it using the host system's sound system. In another embodiment the user may use either the controls on the software emulator or the actual controls on the mobile device.

In another embodiment, the user sends out a message using the secure email channel of a personal digital assistant native device (such as a Blackberry™ device) while composing the message on the host using the host keyboard and mouse. In this example the emulator uses the wireless communication channel from the Blackberry but the input from the host.

In another embodiment, the user may receive a message using the secure channel of a personal digital assistant native device (such as a Blackberry™ device) and view the message on the host device's display and navigate and edit using the host key board and mouse. In this example the emulator uses the wireless communication channel from the Blackberry but the input from the host.

In other embodiments, the native device can include a mobile telephone, a media player, or other portable electronic device with sufficient storage to store the user's personal computing environment.

DETAILED DESCRIPTION

Figure 1:
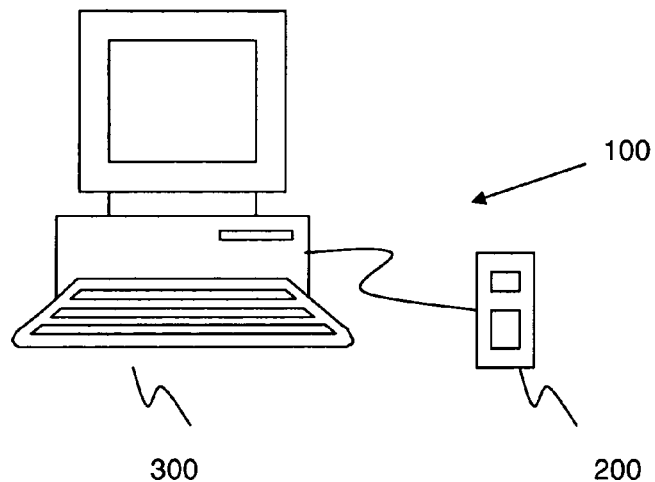
FIG. 1 is a high level block diagram showing an information processing system with a mobile telephone native device according to an embodiment of the invention.

Referring to FIG. 1, there is shown a high level block diagram showing system 100 wherein a native device 200 (such as a mobile telephone or other portable device) is coupled to a host information processing system 300 (e.g., a personal computer or PC) according to an embodiment of the invention. The native device 200 can be coupled to the host system 300 by means of an interface such as a USB (universal serial bus) connection, a Firewire connection, or any other fast network connection. In one embodiment, the native device is a mobile telephone with enough memory to carry a user's personal computing environment including an operating system image, applications programs, data, and the current state of the user's system. Modern mobile telephones can already include four Giga Bytes of storage and are likely to include more in the future, which is enough to store the foregoing information. Portable music players such as an iPod™ music player by Apple Computer Inc. of Cupertino, Calif., can include 60 Gigabytes of storage, also providing sufficient space to store the information.

Figure 2:
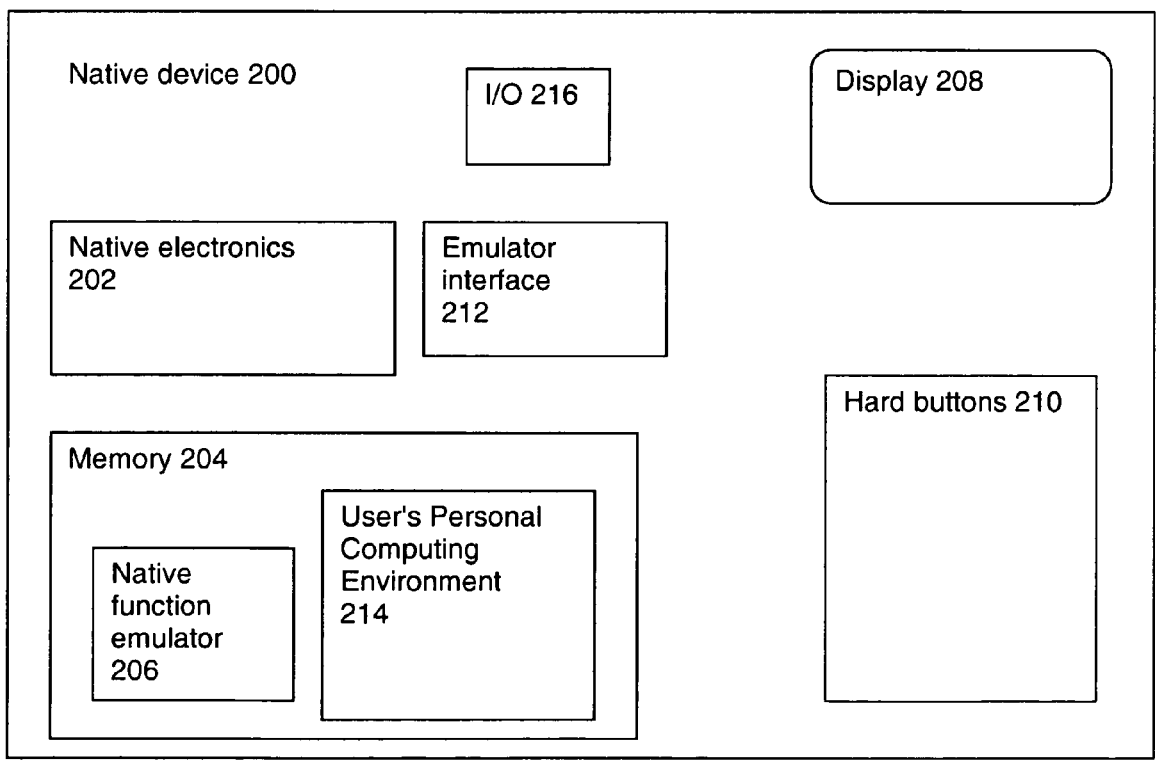
FIG. 2 is block diagram of a mobile telephone native device according to the embodiment of the invention.

Referring to FIG. 2 there is shown a highly simplified block diagram of the native device 200. The native device 200 comprises native function electronics 202 (possibly including a processor and/or communication subsystem), a memory 204, and a native function software emulator 206 for use by the host system 300 in emulating the functionality of the native device 200. The function of the native device 200 can be used for a communication subsystem, input controls, or audio, graphics, and video playing functions. The memory 204 has a large capacity used to store the user's personal computing environment 214 and possibly emulator software (native function emulator) 206 for emulating the functionality of the native device 200 in the host PC 300. In one embodiment, the host system 300 already includes an emulator 316 (see FIG. 3) for the functionality of the native device 200. Obviously, in such cases the host system may not need to use the native device's emulator 206. However, the presence of the emulator 206 enables the host system 300 to boot from the native device 200 and use the emulator 206. The native device 200 also includes an I/O interface 216 for coupling to the host system 300 or any other device, possibly using a fast serial connection. For example, the interface 216 can be a USB connector adapted to receive a USB cable that connects to the host system 300. The native device 200 also comprises an emulator interface 212 for the host system 300 interfacing with the emulator 206 and/or a set of hard buttons 210 to allow the user to control the functionality of the native device 200. For example, the hard buttons 210 can be keys in a mobile phone or PDA (personal digital assisitant). The native device 200 also comprises a display 208 for displaying information relating to the native functionality of the device 200. Other user interfaces can be used including scrolling wheels and the like. The emulator interface 212 can interface with a communication subsystem on the native device as well.

According to the mobile telephone embodiment of the invention, the native electronics 202 comprises the telecommunications circuitry and software (or firmware) generally present in modern conventional mobile telephones and the emulator 206 enables the host system 300 to emulate the telephone functions via the interface 212. In another embodiment, the native device 200 is a media player for playing music (e.g., an iPod) and the host system uses its own resources (such as its speaker) to perform the function of the music player on the music stored in the memory 204. Other embodiments can use a personal digital assistant (e.g., a BlackBerry™ by Research in Motion Corporation, or a portable gaming device (e.g., a GameBoy™ by Nintendo) or other portable electronic devices having sufficient memory.

Figure 3:
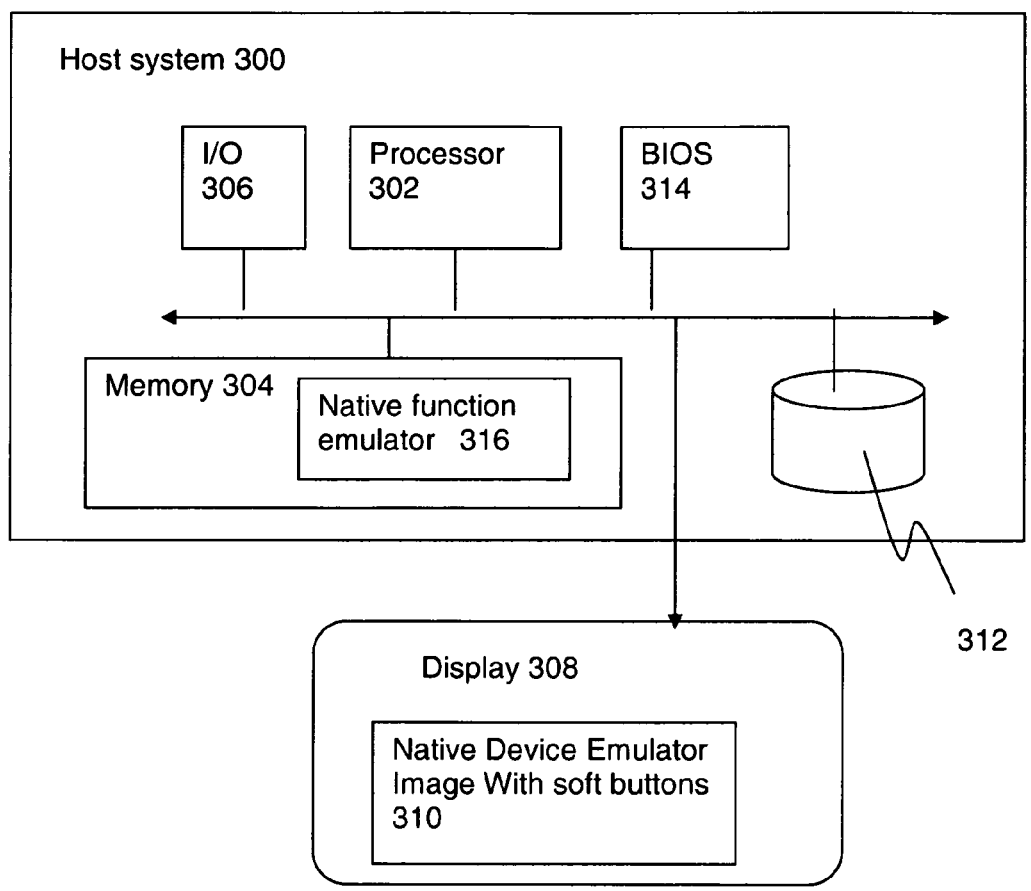
FIG. 3 shows an information processing system with a telephone emulation screen.

Referring to FIG. 3, there is shown a high level block diagram of an embodiment of the host system 300 as a personal computer. The host system 300 comprises a processor 302, a memory 304, an input/output subsystem 306, a hard disk drive 312, and a BIOS 314. The memory 304 (or the storage device 312) can store one or more native function emulators 316 for emulating the functionality of one or more native devices 200. This is similar to the emulator 206 hosted in the native device 200. The emulator 316 can emulate a user interface for controlling the native device 200, a communication function of the native device 200, and/or a media playing function of the native device 200. The host system 300 also includes a display 308 for displaying (among other things) an image 310 representing the functionality of the native device 200 being emulated by the host system 300. The presence of the emulator 316 in the host system 300 enables a user to connect the native device 200 to the host system 300 while the host system is running.

We now illustrate how we enable a mobile phone's function as a soft phone (or telephone emulator) possibly shown as an icon or other image 310 on the user's screen 308. The emulation begins when the native device 200 is coupled to the PC 300. In the example where the native device 200 is a mobile phone, the mobile phone is attached to the personal computer 300 and the host 300 optionally boots from the memory 204 of the native device 200. The software phone emulator (soft phone) will be started on the personal computer 300 and displayed on the PC display 308. The soft phone will provide the phone function to the user by using icons such as a virtual phone 310, while his mobile phone is connected to the PC 300. The data on the mobile phone, such as address books, user preferences, and the like are made available from the storage medium 204 on the mobile phone native device 200 and can be displayed on the display 308. The communication functionality of the mobile phone 200 may be transferred to the soft phone using SIP/VOIP (session initiation protocol/voice over internet protocol) technology or by more direct means. Using SIP/VOIP technology, calls destined for the mobile phone 200 are rerouted to the SIP URI (uniform resource identifier) assigned to the user. The SIP URI for the user is modified to point to the user's computer 300 while the user's mobile phone 200 is attached to the user's computer 300. The SIP URI reverts to point to the user's mobile phone 200 when the user disconnects his mobile phone 200 from the computer 300. This way, the mobile phone service provider is able to redirect the user's calls to a soft phone program on the user's computer. In alternate methods, the mobile phone may use a Bluetooth audio connection between the mobile phone and the PC. In this case the PC's microphone and speaker appear as a Bluetooth headset to the mobile phone and a different functional handoff point is used. The functional handoff point that is used may depend on the function of the native device and the capability of the host device.

The software program that facilitates the transition of the functionality of the mobile phone to the PC is provided and launched when necessary. A program that transitions the functionality back from the host device to the native device is also provided and executed when necessary. In addition, a software emulator that provides the native device's function on the host device is present either on the host or native device. The software emulator also exposes a familiar user interface to the user and may choose to present a one-to-one mapping between the keys and buttons on the native device and the virtual buttons and keys on the software emulator.

Using this method, the user is able to get the complete functionality of the native device 200 on the host system 300. The same method works with a music device such as an iPod or other device that has a native function.

Figure 4:
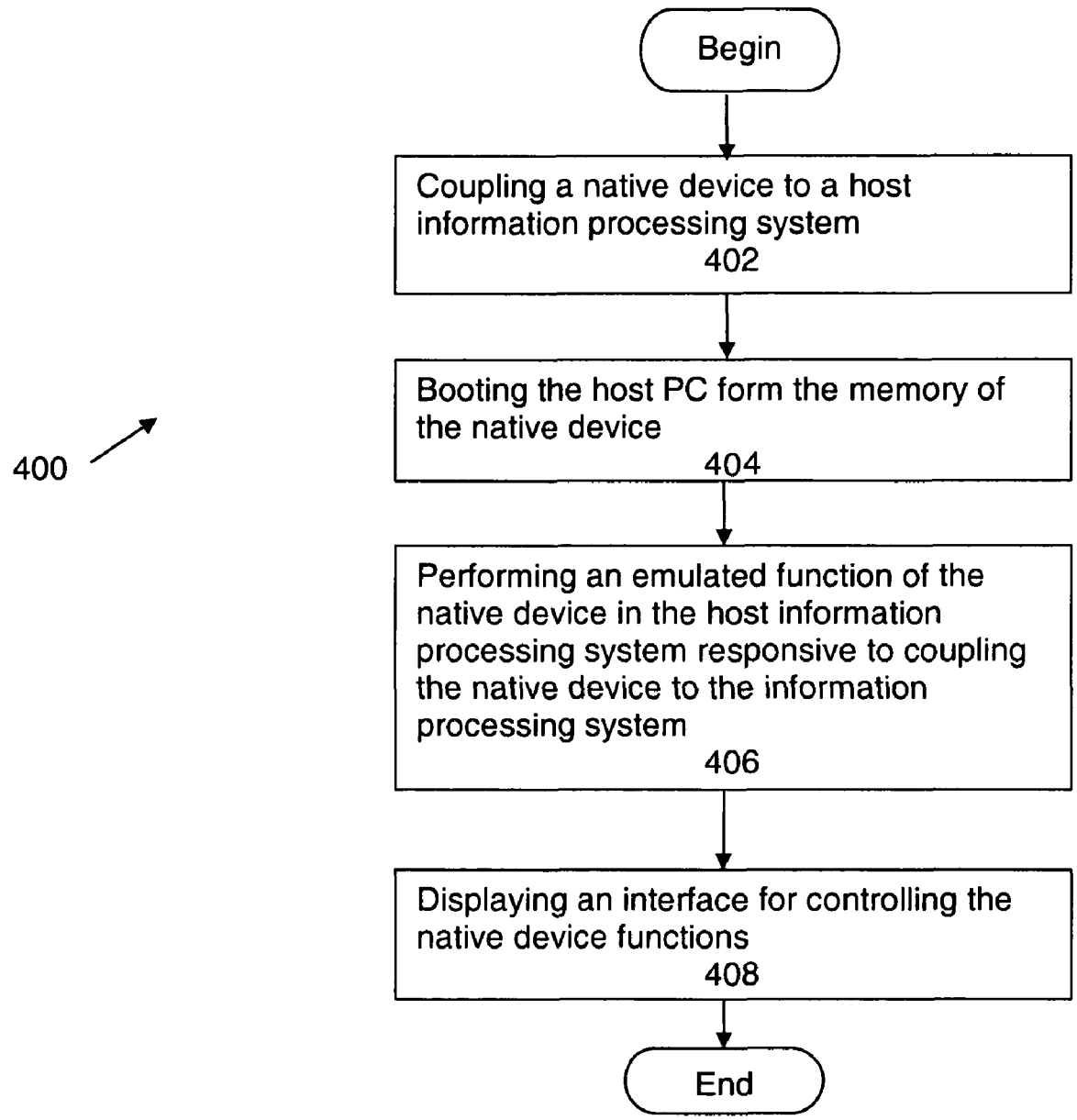
FIG. 4 is a flowchart of a method according to an embodiment of the invention.

FIG. 4 is a flowchart of a method 400 according to an embodiment of the invention. In step 402 the native device 200 is coupled to the host system 300. In step 404 the host system 300 is booted from the memory 204. In other embodiments the system 300 need not be booted from the memory 204. In other words, the native device 200 is simply coupled to an already running system. In step 406 the system 300 performs an emulated function of the native device 200 in the host information processing system 300 possibly in response to coupling the native device 200 to the information processing system 300. In step 408 an interface for controlling the native device 200 is displayed to the user. The method 400 can further comprise steps of activating and configuring, with or without user support, the software emulator 316 on the host 300 and the emulator interface 212 on the native device 200 when the native device 200 is coupled to the host system 300. The method 400 can further comprise steps of deactivating and configuring, with or without user support, the software emulator interface 212, when the native device 200 is decoupled from the host system 300.

Therefore, while there has been described what is presently considered to be the preferred embodiment, it will understood by those skilled in the art that other modifications can be made within the spirit of the invention.

We claim:

1. A machine-implemented method comprising:
   attaching mobile telephone to a host computer system machine;
   wherein the mobile telephone comprises:
      a memory;
      native function electronics;
      an input/output interface;
      storage storing a user's personal computing environment, wherein the personal computing environment comprises an operating system image, applications programs, data, and a current state of the mobile telephone;
      an emulator interface providing an interface familiar to the user; and
      a software emulator that is accessed by the host computer system machine to emulate functionality of the mobile telephone on said host Computer system machine;
      wherein said software emulator has access to the memory, the native function electronics, the user's personal computing environment, and input/output devices of said mobile telephone; and
      wherein said software emulator can communicate with programs running on said mobile telephone, including a communication subsystem of said mobile telephone; and
   wherein the host computer system machine is a computer to which the mobile telephone is attached;
   in response to attaching the mobile telephone to the host computer system machine:
      activating and configuring the software emulator and the emulator interface on the mobile telephone when the mobile telephone is attached with the host computer system machine;
      initiating a booting of the host system from the memory of the mobile telephone, wherein said booting is initiated responsive to the activating;
      using the software emulator to present to the user, on the host computer system machine, the emulator interface for controlling mobile telephone;
      performing an emulated function of the mobile telephone in the host computer system machine, wherein performing the emulated function comprises:
         transitioning functionality of at least some of the native functions from the mobile telephone to the host computer system machine;
         routing calls destined for the mobile telephone to said host computer system machine in response to coupling to said host computer system machine;
         using the emulator interface to perform the at least some native functions of the mobile telephone on the host computer system machine; and
      deactivating the software emulator on the host computer system machine and the emulator interface on the mobile telephone when the mobile telephone is decoupled from the host computer system machine, wherein said deactivating transitions functionality from the host computer system machine back to the mobile telephone.

2. The method of claim 1, further comprising configuring the software emulator on the host computer system machine and the emulator interface on the mobile telephone when the mobile telephone is coupled to said host computer system machine.

3. The method of claim 2, further comprising activating the software emulator on the host computer system machine and the emulator interface on the mobile telephone when the mobile telephone is coupled to said host computer system machine.

4. A machine-implemented method comprising:
   attaching mobile telephone of a user to a host computer system machine while the host computer system machine is running;
   wherein the mobile telephone comprises:
      a memory;
      native function electronics;
      an input/output interface;
      storage storing a user's personal computing environment,
   wherein the personal computing environment comprises an operating system image, applications programs, data, and a current state of the mobile telephone; and
      an emulator interface providing an interface familiar to the user; and
   wherein the host computer system machine is a computer to which the mobile telephone is attached;
   wherein the host computer system machine comprises at least one software emulator to emulate functionality of the mobile telephone on said host computer system machine;
   activating and configuring the software emulator on the host computer system machine and the emulator interface on the mobile telephone when the mobile telephone is attached with the host computer system machine;
   wherein the software emulator has access to the memory, the native function electronics, the user's personal computing environment, and input/output devices of the mobile telephone;
   using the software emulator to present to the user, on the host computer system machine, the emulator interface for controlling the mobile telephone;
   performing an emulated function of the mobile telephone in the host computer system machine, wherein performing the emulated function comprises:
      transitioning functionality of at least some of the native functions from the mobile telephone to the host computer system machine;
      routing calls destined for the mobile telephone to said host computer system machine in response to coupling to said host computer system machine;
      using the emulator interface to perform the at least some native functions of the mobile telephone on the host computer system machine; and deactivating the software emulator on the host computer system machine and the emulator interface on the mobile telephone when the mobile telephone is decoupled from the host computer system machine, wherein said deactivating transitions functionality from the host computer system machine back to the mobile telephone.

5. The method of claim 4, further comprising configuring the software emulator on the host computer system machine and the emulator interface on the mobile telephone when the mobile telephone is coupled to said host computer system machine.

6. The method of claim 4, wherein using the emulator interface to perform the at least some native functions comprises displaying an image representing functionality of the mobile telephone.

7. The method of claim 4, wherein performing the emulated function of the mobile telephone in the host computer system machine further comprises requesting a telecommunications service provided to redirect calls destined for the mobile telephone to the mobile telephone in response to decoupling the mobile telephone from the host computer system machine.

8. A mobile telephone comprising:
a memory;
storage storing a user's personal computing environment, wherein the personal computing environment comprises an operating system image, applications programs, data, and a current state of the mobile telephone;
an interface for attaching with a host device;
a native function subsystem for performing native function;
logic wherein calls destined for the mobile telephone are routed to the host device in response to coupling to said host device;
a software emulator that is accessed by the host device to emulate the native functions of the mobile telephone on said host device;
wherein the software emulator is activated and configured when the mobile telephone is attached to the host device;
wherein the software emulator has access to the memory, the native function subsystem, the user's personal computing environment, and input/output devices of the mobile telephone; and
wherein the software emulator can communicate with programs running on said mobile telephone, including a communication subsystem of said mobile telephone;
wherein the host device is booted from the memory of the mobile telephone, responsive to the activating of the software emulator; and
wherein the software emulator is deactivated on the host device when the mobile telephone is decoupled from said host device; and
an emulator interface presented to the user, on the host device, for controlling the native functions of the mobile telephone.

9. The mobile telephone of claim 8, wherein the at least part of the function from the mobile telephone is a communication subsystem of the mobile telephone.

10. The mobile telephone of claim 8, wherein the at least part of the function of the mobile telephone comprises input controls.

11. The mobile telephone of claim 8 wherein the at least part of the function of the mobile device comprises at least one of audio, graphics, and video player.

12. The mobile telephone of claim 8 wherein the native function emulator and the interface on the mobile telephone are activated and configured, without user support, when the mobile telephone is coupled with the host device.

13. The mobile telephone of claim 8 further comprising logic for requesting a telecommunications service to redirect to the host device calls destined for the mobile telephone, in response to coupling the mobile telephone to the host device.

14. The mobile telephone of claim 8, wherein the memory comprises a personal computing environment.

15. The mobile telephone of claim 8, wherein the emulator interface provides telephone functions to a user by using icons representing a virtual phone.

16. The mobile telephone of claim 8 further comprising a native function emulator.

* * * * *